(12) United States Patent
Kim et al.

(10) Patent No.: US 9,084,206 B2
(45) Date of Patent: Jul. 14, 2015

(54) METHOD AND APPARATUS FOR CONTROLLING UPLINK TRANSMISSION POWER IN WIRELESS COMMUNICATION SYSTEM

(75) Inventors: Soeng-Hun Kim, Suwon-si (KR); Joon-Young Cho, Suwon-si (KR); Jin-Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 1496 days.

(21) Appl. No.: 12/490,022

(22) Filed: Jun. 23, 2009

(65) Prior Publication Data

US 2010/0323744 A1    Dec. 23, 2010

(51) Int. Cl.
| | |
|---|---|
| H04B 7/00 | (2006.01) |
| H04W 52/24 | (2009.01) |
| H04W 52/06 | (2009.01) |
| H04W 52/14 | (2009.01) |
| H04W 52/28 | (2009.01) |
| H04W 52/34 | (2009.01) |

(Continued)

(52) U.S. Cl.
CPC ............ *H04W 52/247* (2013.01); *H04W 52/06* (2013.01); *H04W 52/146* (2013.01); *H04W 52/248* (2013.01); *H04W 52/281* (2013.01); *H04W 52/343* (2013.01); *H04W 52/10* (2013.01); *H04W 52/16* (2013.01); *H04W 52/242* (2013.01); *H04W 52/246* (2013.01)

(58) Field of Classification Search
CPC .......... H04W 52/146; H04W 72/0406; H04W 72/0413; H04W 52/08; H04W 72/042; H04W 52/58; H04W 52/18

USPC ......... 455/522, 450, 452.1, 70; 375/326, 141; 370/482

See application file for complete search history.

(56) References Cited

U.S. PATENT DOCUMENTS 7,940,737 B2 * 5/2011 Yoon et al. .................... 370/342

(Continued)

FOREIGN PATENT DOCUMENTS

| EP | 1 367 739 | 12/2003 |
|---|---|---|
| WO | WO 2010/091425 | 8/2010 |

OTHER PUBLICATIONS

3rd Generation Partnership Project; Technical Specification Group Radio Access Network; Physical Layer Procedures-(FDD) (Release 8), 3GPP TS 25.214 V8.0.0, Nov. 2007.

(Continued)

*Primary Examiner* — Shaima Q Aminzay
(74) *Attorney, Agent, or Firm* — The Farrell Law Firm, P.C.

(57) ABSTRACT

A method and system are provided for controlling uplink transmission power in a wireless communication system. At least one of a plurality of downlink carriers and a plurality of uplink carriers are aggregated, and the plurality of downlink carriers and the plurality of uplink carriers are mapped between a User Equipment (UE) and a network in the wireless communication system. A message relating to uplink carrier transmission power is received at the UE from the network via a downlink carrier. Uplink transmission power of one or more uplink carriers is controlled in accordance with the message and aggregation and mapping of at least one of the downlink carrier and the one or more uplink carriers.

12 Claims, 9 Drawing Sheets

(51) Int. Cl.
*H04W 52/10* (2009.01)
*H04W 52/16* (2009.01)

(56) References Cited

U.S. PATENT DOCUMENTS

2005/0041573 A1* 2/2005 Eom et al. ............... 370/208
2009/0257449 A1* 10/2009 Chen et al. .............. 370/470
2010/0015967 A1* 1/2010 Perets et al. ............ 455/422.1
2011/0038271 A1 2/2011 Shin et al.

OTHER PUBLICATIONS

Samsung, "UL Transmission Power Control in LTE-A", R1-091880, 3GPP TSG RAN WG1 #57, May 4-8, 2009.
Samsung, "PDCCH Structure in LTE-A", R1-091235, 3GPP TSG RAN WG1 #56bis, Mar. 23-27, 2009.
NTT Docomo, "Comparison of PDCCH Transmission and Coding Schemes for LTE-Advanced", R1-090895, 3GPP TSG RAN WG1 Meeting #56, Feb. 9-13, 2009.

* cited by examiner

PRIOR ART

PRIOR ART

METHOD AND APPARATUS FOR CONTROLLING UPLINK TRANSMISSION POWER IN WIRELESS COMMUNICATION SYSTEM

BACKGROUND OF THE INVENTION

1. Field of the Invention

The present invention relates generally to wireless communication systems, and more particularly, to a method and apparatus for efficiently controlling uplink transmission power of a mobile terminal using aggregated multiple uplink carriers.

2. Description of the Related Art

The development of mobile communication systems has enabled users on the move to be accommodated with communication services. Further, mobile communication systems have been developed to support data communication services in addition to standard voice communication services.

Long Term Evolution (LTE) is a broadband packet-based communication technology, which is expected to soon be commercially available, and which is currently undergoing standardization so that it may be utilized in the 3rd Generation Partnership Project (3GPP).

Referring initially to FIG. 1, a schematic diagram illustrates an LTE mobile communication system. An Evolved Radio Access Network (E-RAN) 110, 112, is simplified with a two-node architecture composed of Evolved Node B's (ENBs or Node B's) 120, 122, 124, 126, 128, and Access Gateways, or Enhanced Gateway General Packet Radio Service (GPRS) Support Nodes (EGGSN) 130, 132. A User Equipment (UE) 101 accesses an Internet Protocol (IP) network 114 via the E-RAN 110, 112.

The ENBs 120-128 correspond to the conventional Node B's of a Universal Mobile Telecommunications System (UMTS). Each of the ENBs 120-128 connects to the UE 101 and performs the functions of a conventional Node B. In the LTE system, all user traffic, including real time services such as Voice over IP (VoIP), is served through a shared channel.

In a data communication service, a resource is allocated in consideration of an amount of data to be transmitted and channel status, which differs significantly from voice communication services. Accordingly, a mobile communication system is provided with a scheduler, which manages resource allocation in consideration of the available resources, channel status, transmission data amount, and the like. Such resource scheduling is required in LTE. A scheduler that is incorporated into a base station is responsible for management of radio transmission resources. ENBs 120-128 of FIG. 1 collect status information of UEs and schedule the UEs based on the collected status information. Each ENB 120-128 controls a plurality of cells.

LTE promises download speeds that are up to 100 Mbps. In order to achieve these high data rates, various studies have been conducted in several areas, including minimization of the number of nodes involved in the connections, simplification of network topology, and close placement of radio protocol to radio channels. LTE also uses Orthogonal Frequency Division Multiplexing (OFDM) as a radio access technology in order to achieve these transmission rates. LTE also utilizes Adaptive Modulation & Coding (AMC) in determining the modulation scheme and channel coding rate in accordance with the channel status of the UE.

Recently, LTE-Advanced (LTE-A) has been introduced to further improve the transmission speed through the use of diverse new technologies in the LTE communication system, such as carrier aggregation. Carrier aggregation is a technique in which multiple downlink and uplink carriers are aggregated for a mobile terminal.

FIG. 2 is a diagram illustrating carrier aggregation in an LTE mobile communication system. Typically, a base station transmits and receives a plurality of carriers within different frequency bands. For example, when an ENB 205 uses a first carrier 215 of which the center frequency is f1 and a second carrier 210 of which center frequency is f2, a UE 220 transmits and receives a signal and transmits data through one of the two carriers in the conventional communication system. When the UE has carrier aggregation capability, it can be allocated more carriers to increase its transmission speed.

Due to the fact that uplink transmission causes inter-cell interference, it is necessary for uplink transmission power to be maintained at an appropriate level. In order to control the uplink transmission power, the base station sends the UE an uplink transmission power control command through the downlink carrier. The uplink transmission power control command carries information for adjusting the transmission power of the UE and may be carried in the form of a separate control signal or by way of a transmission resource allocation signal.

In a conventional mobile communication system, the UE is allocated a single downlink carrier and a single uplink carrier. Therefore, the uplink carrier to which the uplink transmission power control command refers is clear. However, in the advanced mobile communication system described above in which a mobile terminal transmits through multiple uplink carriers, the uplink carrier to which the uplink transmission power control command refers is not clear.

SUMMARY OF THE INVENTION

The present invention has been made to address at least the above problems and/or disadvantages and to provide at least the advantages described below. Accordingly, an aspect of the present invention provides a method and system for controlling uplink transmission power in a wireless communication system.

According to one aspect of the present invention, a method is provided for controlling uplink transmission power in a wireless communication system. At least one of a plurality of downlink carriers and a plurality of uplink carriers are aggregated, and the plurality of downlink carriers and the plurality of uplink carriers are mapped between a User Equipment (UE) and a network in the wireless communication system. A message relating to uplink carrier transmission power is received at the UE from the network via a downlink carrier. Uplink transmission power of one or more uplink carriers is controlled in accordance with the message and aggregation and mapping of at least one of the downlink carrier and the one or more uplink carriers.

According to a further aspect of the present invention, a client terminal is provided for a User Equipment (UE) of a wireless communication system for controlling uplink transmission power. The UE includes a transceiver for transmitting and receiving messages relating to aggregation of at least one of a plurality of downlink carriers and a plurality of uplink carriers and to mapping of the plurality of downlink carriers and the plurality of uplink carriers between the UE and a network of the wireless communication system, and for receiving a message relating to uplink carrier transmission power from the network via a downlink carrier. The UE also includes an uplink transmission power controller for controlling uplink transmission power of one or more uplink carriers in accordance with the message and aggregation and mapping of at least one of the downlink carrier and the one or more uplink carriers.

According to an additional aspect of the present invention, a network of a wireless communication system for controlling uplink transmission power is provided. The network aggregates at least one of a plurality of downlink carriers and a plurality of uplink carriers, and maps the plurality of downlink carriers and the plurality of uplink carriers between a User Equipment (UE) and the network in the wireless communication system. The network also transmits a message relating to uplink carrier transmission power to the UE via a downlink carrier. Uplink transmission power of one or more uplink carriers is controlled in accordance with the message and aggregation and mapping of at least one of the downlink carrier and the one or more uplink carriers.

According to another aspect of the present invention, a system is provided for controlling uplink transmission power in a wireless communication system. The system includes a network for aggregating at least one of a plurality of downlink carriers and a plurality of uplink carriers, mapping the plurality of downlink carriers and the plurality of uplink carriers between a User Equipment (UE) and the network in the wireless communication system, and transmits a message relating to uplink carrier transmission power to the UE via a downlink carrier. The system also includes the UE that receives a message relating to uplink carrier transmission power from the network via a downlink carrier and controls uplink transmission power of one or more uplink carriers in accordance with the message and aggregation and mapping of at least one of the downlink carrier and the one or more uplink carriers.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EXEMPLARY EMBODIMENTS

Figure 1:
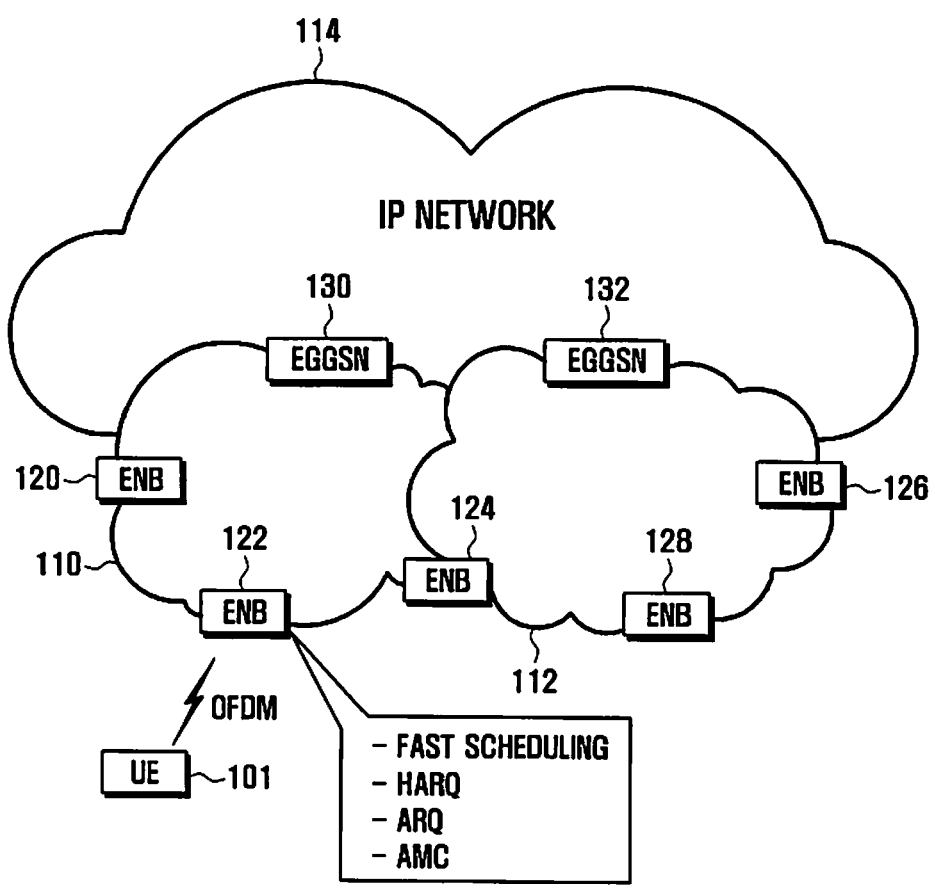
FIG. 1 is a schematic diagram illustrating a configuration of an LTE mobile communication system.
Figure 2:
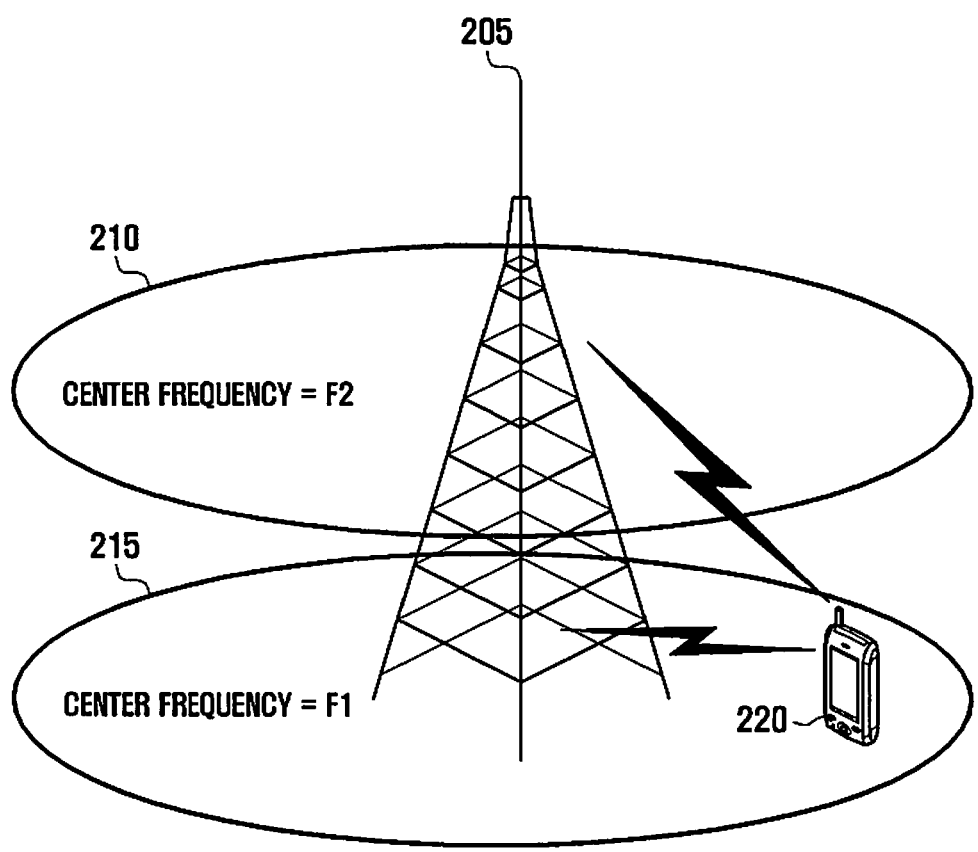
FIG. 2 is a diagram illustrating a carrier aggregation operation in an LTE mobile communication system.

Exemplary embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but are merely used to enable a clear and consistent understanding of the invention. Accordingly, it should be apparent to those skilled in the art that the following description of embodiments of the present invention are provided for illustrative purposes only and not for the purpose of limiting the invention, as defined by the appended claims and their equivalents.

It is to be understood that the singular forms "a," "an," and "the" include plural referents unless the context clearly dictates otherwise. Thus, for example, reference to "an identifier" includes reference to one or more of such identifiers.

The present invention relates to method and devices for controlling uplink transmission power of a user equipment in a wireless communication network. Specifically, the present invention is directed to controlling uplink transmission power of a user equipment by grouping uplink component carriers and setting the uplink transmission power of the uplink component carriers in the same group using a common power control command.

More particularly, a carrier aggregation message from a base station, in accordance with the present invention, describes a relationship between downlink component carriers and uplink component carriers. The uplink component carriers may be aggregated to form an uplink component carrier group. The downlink component carriers may also be aggregated to form a downlink component carrier group. The component carriers are grouped together based on carrier frequencies in close proximity to each other such that they exhibit similar transmission characteristics. The carrier aggregation message includes information that maps a downlink component carrier and/or downlink component carrier group to a corresponding uplink component carrier and/or uplink component carrier group.

The uplink transmission power to be set for an uplink component carrier is based on a Transmit Power Command (TPC) and at least an amount of path loss of the downlink component carrier. Accordingly, the carrier aggregation message includes additional information for setting the uplink transmission power. In one exemplary embodiment, a downlink component carrier is designated as the TPC source. In another exemplary embodiment, TPCs of downlink component carriers of a downlink component carrier group are accumulated as the TPC source. In another exemplary embodiment, a downlink component carrier is designated as the path loss source. In yet another exemplary embodiment, a download component carrier for the path loss is selected according to a predetermined rule.

The base station sends the carrier aggregation message to the user equipment. The user equipment in accordance with the present invention receives the carrier aggregation message and controls the uplink transmission power by applying the power control commands from the downlink component carriers to the corresponding uplink component carriers according to the mapping indicated in the carrier aggregation message. A detailed description of the methods and devices in accordance with the present invention is explained below.

Figure 3:
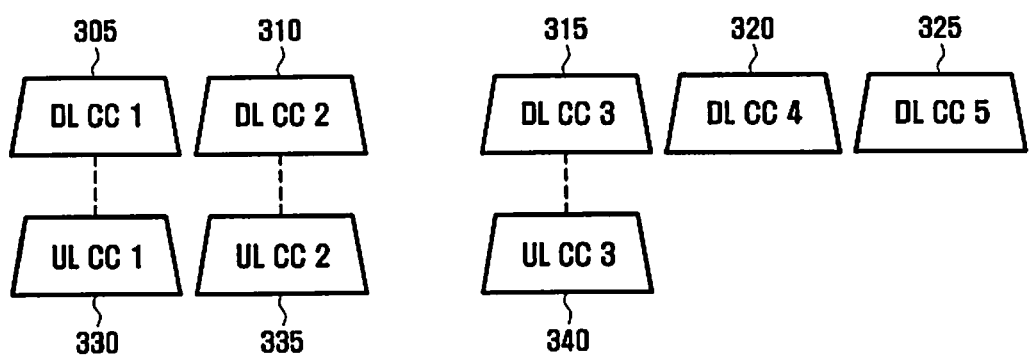
FIG. 3 is a diagram illustrating carrier aggregation in an LTE mobile communication system, according to an embodiment of the present invention.

Referring to FIG. 3, a diagram illustrates carrier aggregation in an LTE mobile communication system, according to an exemplary embodiment of the present invention. For purposes of explanation, downlink carrier aggregation of the UE is referred to as Downlink Component Carrier (DL CC), and uplink carrier aggregation is referred to as Uplink Component Carrier (UL CC). Uplink carriers and downlink carriers of the UE may be mapped in advance for simplicity. The uplink transmission power of a specific uplink carrier is indicated only by the uplink transmission power control command received through the downlink carrier mapped to the corresponding uplink carrier.

FIG. 3 illustrates an exemplary configuration using five downlink carriers, DL CC 1 (305), DL CC 2 (310), DL CC 3 (315), DL CC 4 (320), and DL CC 5 (325), and three uplink carriers, UL CC 1 (330), UL CC 2 (335), and UL CC 3 (340). For example, DL CC 1 (305) is mapped to UL CC 1 (330). DL CC 2 (310) is mapped to UL CC 2 (335). DL CC 3 (315) is mapped to UL CC 3 (340). Thus, the uplink transmission power control command for UL CC 1 (330) is transmitted through the DL CC 1 (305), the uplink transmission power control command for UL CC 2 (335) is transmitted through DL CC 2 (310), and the uplink transmission power control command for UL CC 3 (340) is transmitted through DL CC 3 (315).

Due to the fact that carrier aggregation seeks to transmit data using multiple carriers that belong to different frequency band in an aggregated manner, a plurality of discontiguous frequency bands are likely to be involved in transmission. Uplink transmission powers of uplink carriers are likely to be similar to each other when same amount of data is transmitted through the uplink carriers that are close to each other in terms of carrier frequency in an identical Modulation and Coding Scheme (MCS).

Figure 4:
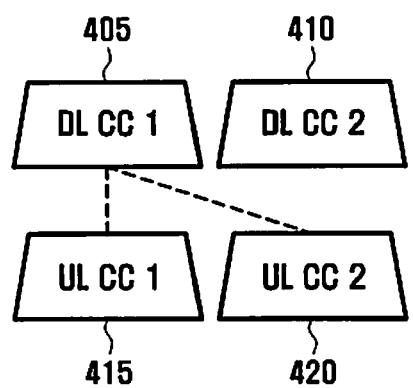
FIG. 4 is a diagram illustrating carrier aggregation in an LTE mobile communication system, according to another embodiment of the present invention.

According to an exemplary embodiment of the present invention, a method and device for controlling the uplink transmission power of multiple uplink carriers include using a single uplink transmit power control command in consideration of the above characteristics. Referring to FIG. 4, a diagram illustrates carrier aggregation in an LTE mobile communication system, according to another exemplary embodiment of the present invention. UL CC 1 (415) and UL CC 2 (420) are adjacent with or in close proximity with respect to their center frequencies. The uplink transmission power control of these carriers can be performed based on a single uplink transmission power control command delivered through the single DL CC 1 (405). For purposes of explanation in accordance with the present invention, uplink carriers whose transmission power can be controlled by a single uplink power control command are referred to as a Power Control Uplink Carrier Group (PC UL CG). In some of the exemplary embodiments, the carriers of the PC UL CG are positioned in adjacent frequency bands, or in such close proximity, such that their uplink powers can be adjusted in the same manner by an identical uplink transmission control command, and the base station sends the UE the information to the PC UL CG using a predetermined control message.

A Power Control Downlink Carrier Group (PC DL CG) includes one or more downlink carriers. An uplink transmission power control command carried through a downlink carrier included in the PC DL CG is adapted for all uplink carriers belonging to the PC UL CG mapped to the PC DL CG.

Figure 5:
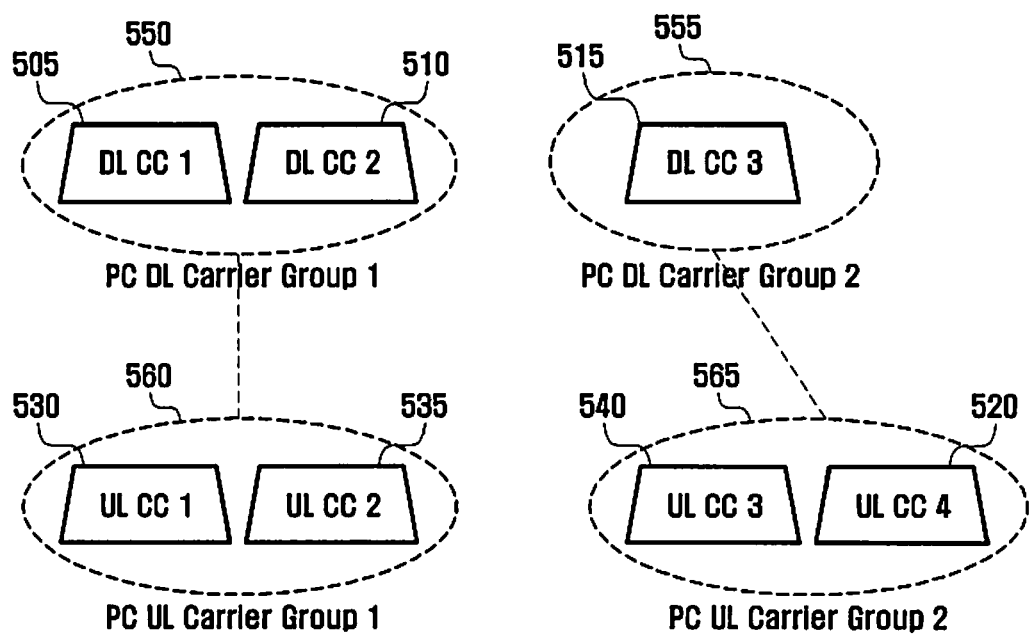
FIG. 5 is a diagram illustrating a configuration of a Power Control Downlink Carrier Group (PC DL CG) and a Power Control Uplink Carrier Group (PC UL CG), according to a first embodiment of the present invention.

Referring to FIG. 5, a diagram illustrates an exemplary configuration of PC DL CG and PC UL CC, according to a first exemplary embodiment of the present invention. For purpose of example, PC DL CG 1 (550) includes DL CC 1 (505) and DL CC 2 (510). PC DL CG 2 (555) includes DL CC 3 (515). PC UL CG 1 (560) includes UL CC 1 (530) and UL CC 2 (535). PC UL CG 2 (565) includes UL CC 3 (540) and the UL CC 4 (520).

PC DL CG 1 (550) is mapped to PC UL CG 1 (560) and PC DL CG 2 (555) is mapped to PC UL CG 2 (565). An uplink transmission power control command delivered through each of DL CC 1 (505) and DL CC 2 (510) is used for adjusting the transmission powers of UL CC 1 (530) and UL CC 2 (535) in the same manner. An uplink transmission power control command delivered through DL CC 3 (515) is used for adjusting the transmission powers of UL CC 3 (540) and UL CC 4 (520) in the same manner.

When a transmission power control command instructing an increase in transmission power by x dB is received through DL CC 2 (510), the UE increases the transmission power of both UL CC 1 (530) and UL CC 2 (535) by x dB. Specifically, the UE adjusts the transmission power adjustment variables of UL CC 1 (530) and UL CC 2 (535) in the same manner in accordance with the uplink transmission power control command received through DL CC 2 (510). The transmission power adjustment variable is a value added in a next transmission power calculation for the uplink transmission of the UE.

Figure 6:
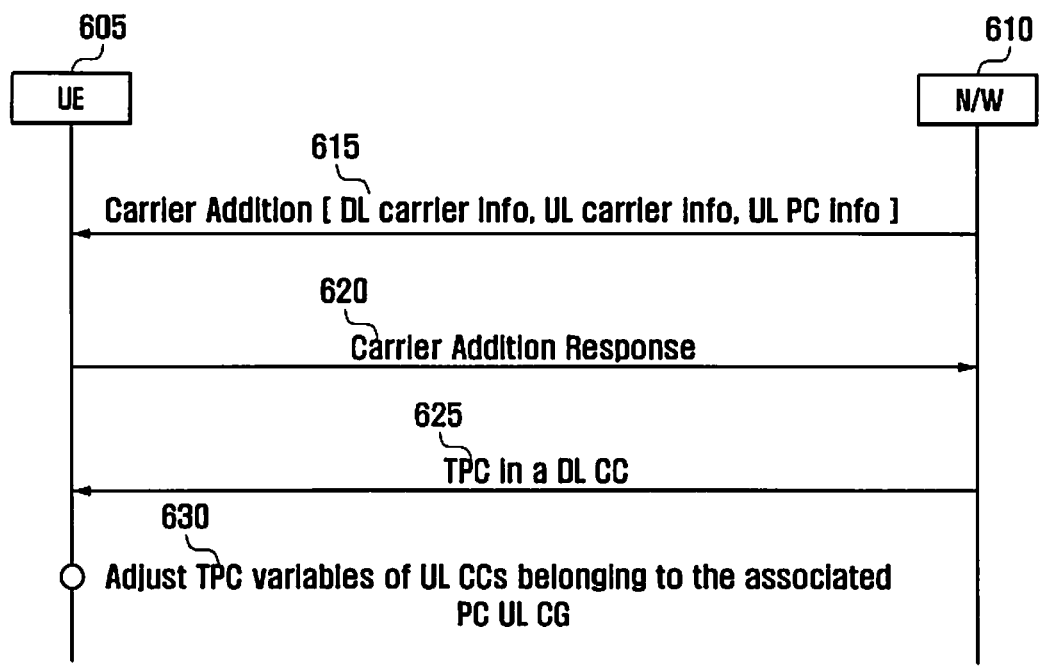
FIG. 6 is a message flow diagram illustrating message flows between a network and a UE, according to the first embodiment of the present invention.

Referring to FIG. 6, an exemplary message flow diagram illustrates message flows between a network 610 and a UE 605 for carrier aggregation, according to the first exemplary embodiment of the present invention. In an exemplary embodiment of the present invention, the network 610 can be an ENB. The network 610 determines aggregation of multiple carriers for the UE 605 in accordance with the loads of the carriers and the traffic requirement status of the UE 605. In order to allocate aggregated carriers to the UE 605, the network 610 sends the UE 605 a control message, which includes information about the aggregated carriers. When carrier aggregation is triggered by an increase of the downlink data such that only downlink carrier aggregation is required, the carrier aggregation control message needs to aggregate both a pair of downlink carrier information and uplink carrier information because data communication of the LTE-A system is performed based on Hybrid Automatic Repeat reQuest (HARQ). Accordingly, the UE must transmit HARQ feedback information in an uplink direction after receiving downlink data, and must receive the HARQ feedback information in a downlink direction after transmitting uplink data.

When the HARQ feedback information on user data transmitted through a downlink/uplink carrier is transmitted through another uplink/downlink carrier, the downlink/uplink carrier and the uplink/downlink carrier are correlated according to HARQ feedback. A predetermined rule may be implemented defining that the carrier aggregation message includes information on both the uplink and downlink carriers and the paired downlink carrier and uplink carrier correlated according to HARQ feedback.

Downlink carrier information includes the center frequency and bandwidth of the downlink carrier. Uplink carrier information includes the center frequency and bandwidth of the uplink carrier. The control message also includes information about transmission power control of the uplink carrier, for example, information indicating the PC UL CG to which the uplink carrier belongs. The indication information can be an identifier uniquely assigned to the PC UL CG or an identifier uniquely assigned to an uplink carrier of which transmission power is controlled with other aggregated uplink carriers. The control information also can include information on the PC DL CG. The PC DL CG information can be an identifier of the PC DL CG composed of the downlink carriers aggregated with reference to the control message. When all the downlink carriers associated with the uplink carriers of a PC UL CG according to HARQ feedback belong to the PC DL CG mapped to the PC UL CG, there is no need to signal information on the PC DL CG.

The information contained in the carrier aggregation message is shown in Table 1 below.

TABLE 1

| Name | Description |
|---|---|
| > aggregated carrier information | |
| >> downlink carrier information | |
| >>> DL CC id | Identifier of downlink carrier |
| >>> Carrier Frequency | Center frequency of downlink carrier |
| >>> Bandwidth | Bandwidth of downlink carrier |
| >>> PC DL CG information | Information indicating PC DL CG of downlink carriers, e.g. identifier |
| >> uplink carrier information | |
| >>> UL CC id | Identifier of uplink carrier |
| >>> Carrier Frequency | Center frequency of uplink carrier |
| >>> Bandwidth | Bandwidth of uplink carrier |
| >>> PC UL CG information | Information indicating PC UL CG of uplink carriers, e.g. identifier |

In Table 1, '>' indicates hierarchical level of the information. For example, the information marked with two '>' is lower than the information marked with a single '>' in hierarchical structure.

A carrier aggregation message includes information of more than one aggregated carrier. When the PC DL CG and the PC UL CG having the same identifier are mapped to each other, no mapping information is transmitted. Table 2 shows the information of the carrier aggregation message in aggregations of three downlink carriers and four uplink carriers as shown in FIG. 5.

TABLE 2

| > carrier aggregation information | | > carrier aggregation information | |
|---|---|---|---|
| >>downlink carrier information | | >>downlink carrier information | |
| >>> DL CC id | 1 | >>> DL CC id | 2 |
| >>> Carrier Frequency | f1 | >>> Carrier Frequency | f3 |
| >>> Bandwidth | 5 MHz | >>> Bandwidth | 5 MHz |
| >>> PC DL CG information | 1 | >>> PC DL CG information | 1 |
| >> uplink carrier information | | >> uplink carrier information | |
| >>> UL CC id | 1 | >>> UL CC id | 2 |
| >>> Carrier Frequency | f2 | >>> Carrier Frequency | f4 |
| >>> Bandwidth | 5 MHz | >>> Bandwidth | 5 MHz |
| >>> PC UL CG information | 1 | >>> PC UL CG information | 1 |
| > carrier aggregation information | | > carrier aggregation information | |
| >>downlink carrier information | | >>downlink carrier information | |
| >>> DL CC id | 3 | >>> DL CC id | 3 |
| >>> Carrier Frequency | f5 | >>> Carrier Frequency | f5 |
| >>> Bandwidth | 5 MHz | >>> Bandwidth | 5 MHz |
| >>> PC DL CG information | 2 | >>> PC DL CG information | 2 |
| >> uplink carrier information | | >> uplink carrier information | |
| >>> UL CC id | 3 | >>> UL CC id | 4 |
| >>> Carrier Frequency | f6 | >>> Carrier Frequency | f7 |
| >>> Bandwidth | 5 MHz | >>> Bandwidth | 5 MHz |
| >>> PC UL CG information | 2 | >>> PC UL CG information | 2 |

As shown in Table 2, the downlink carrier assigned a DL CC identifier 1 (hereinafter, DL CC x indicates the downlink carrier assigned the DL CC identifier x) is correlated with the uplink carrier assigned a UL CC identifier 1 (hereinafter UL CC y indicates the uplink carrier assigned the UL CC identifier y) according to HARQ feedback, which belong to the PC DL CG 1 and the PC UL CG 1, respectively.

The identification of the PC DL CG can be performed using a predetermined rule defining that all downlink carriers associated with all uplink carriers belonging to a PC UL CG according to HARQ feedback constitutes the PC DL GC mapped to the PC UL CG. When this rule is implemented the identifier of the PC DL CG does not need to be transmitted. The carrier aggregation message includes the information as shown in Table 3 below.

TABLE 3

| Name | Description |
|---|---|
| > aggregated carrier information | |
| >> downlink carrier information | |
| >>> DL CC id | Downlink carrier identifier |
| >>> Carrier Frequency | Center frequency of downlink carrier |
| >>> Bandwidth | Bandwidth of downlink carrier |
| >> uplink carrier information | |
| >>> UL CC id | Uplink carrier identifier |
| >>> Carrier Frequency | Center frequency of uplink carrier |
| >>> Bandwidth | Bandwidth of uplink carrier |
| >>> PC UL CG information | Identifier of PG UL CG including uplink carrier |

Table 4 shows the information carried by a carrier aggregation message in an aggregation of three downlink carriers and four uplink carriers.

TABLE 4

| | | | | |
|---|---|---|---|---|
| > carrier aggregation information | | | > carrier aggregation information | |
| >>downlink carrier information | | | >>downlink carrier information | |
| >>> DL CC id | 1 | | >>> DL CC id | 2 |
| >>> Carrier Frequency | f1 | | >>> Carrier Frequency | f3 |
| >>> Bandwidth | 5 MHz | | >>> Bandwidth | 5 MHz |
| >> uplink carrier information | | | >> uplink carrier information | |
| >>> UL CC id | 1 | | >>> UL CC id | 2 |
| >>> Carrier Frequency | f2 | | >>> Carrier Frequency | f4 |
| >>> Bandwidth | 5 MHz | | >>> Bandwidth | 5 MHz |
| >>> PC UL CG information | 1 | | >>> PC UL CG information | 1 |
| > carrier aggregation information | | | > carrier aggregation information | |
| >>downlink carrier information | | | >>downlink carrier information | |
| >>> DL CC id | 3 | | >>> DL CC id | 3 |
| >>> Carrier Frequency | f5 | | >>> Carrier Frequency | f5 |
| >>> Bandwidth | 5 MHz | | >>> Bandwidth | 5 MHz |
| >> uplink carrier information | | | >> uplink carrier information | |
| >>> UL CC id | 3 | | >>> UL CC id | 4 |
| >>> Carrier Frequency | f6 | | >>> Carrier Frequency | f7 |
| >>> Bandwidth | 5 MHz | | >>> Bandwidth | 5 MHz |
| >>> PC UL CG information | 2 | | >>> PC UL CG information | 2 |

As shown in Table 4, UL CC 1 and UL CC 2 belong to the same PC UL CG, and UL CC 3 and UL CC 4 belong to another PC UL CG. The UL CC 1 and UL CC 2 are associated with the respective DL CC 1 and DL CC 2 according to HARQ feedback, such that the transmission powers of UL CC 1 and UL CC 2 are adjusted on the basis of the uplink transmission power control commands received through DL CC 1 DL CC 2. UL CC 3 and UL CC 4 are associated with the respective DL CC 3 and DL CC 4 according to HARQ feedback such that the transmission powers of UL CC 3 and UL CC 4 are adjusted on the basis of the uplink transmission power control command received through DL CC 3.

The PC UL CG information may include a reference uplink carrier identifier on behalf of the PC UL CG identifier. Specifically, the uplink carriers assigned the same reference downlink carrier identifier can be regarded as belonging to the same PC UL CG.

Referring again to FIG. 6, when the carrier aggregation control information is received by the UE 605 at step 615 from the network 610, the UE 605 sends a response message at step 620, monitors the control channel of the aggregated downlink carriers, receives and transmits data through the aggregated downlink and uplink carriers according to the instruction of the network 610, and transmits and receives the HARQ feedback information through the uplink and downlink carriers mapped to the aggregated downlink and uplink carriers.

If a Transmission Power Control (TPC) command is received at step 625, the UE 605 checks the PC DL CG to which the downlink carrier belongs. The UE then adjusts the uplink transmission power of the uplink carriers belonging to the PC UL CG mapped to the PC DL CG by a value indicated by the TPC command at step 630. Specifically, the uplink transmission power variables of the uplink carriers are adjusted by the value indicated by the TPC command.

Figure 7:
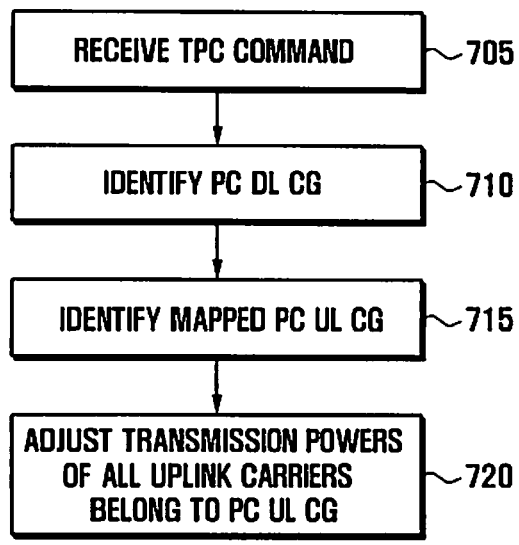
FIG. 7 is a flowchart illustrating a transmission power adjustment methodology of a UE, according to the first embodiment of the present invention.

Referring now to FIG. 7, a flowchart illustrates an exemplary transmission power adjustment methodology of a UE, according to the first exemplary embodiment of the present invention.

A TCP is received through a downlink carrier at step 705. The UE identifies the PC DL CG to which the downlink carrier belongs at step 710. The relationship between the downlink carrier and the PC DL CG is configured by the network in the call establishment process or the carrier aggregation process. The UE checks the PC UL CG mapped to the PC DL CG at step 715. The mapping relationship between the PC DL CG and the PC UL CG is also determined by the network in the call establishment process or the carrier aggregation process. The UE adjusts the transmission powers of all the uplink carriers belonging to the PC UL CG by the value indicated by the TPC at step 720. Specifically, the transmission power adjustment variables of the uplink carriers are adjusted by the value indicated by the TPC. Prior to performing uplink transmission, the UE calculates the transmission power of the uplink carriers at a predetermined time point using Equation (1) below.

$$\text{Uplink transmission power} = \text{MIN}[P_{CMAX}, f(\text{resource amount for uplink transmission}, \text{MCS}, \text{constant}, \text{transmission power adjustment variable}, \text{and path loss})] \quad (1)$$

"$P_{CMAX}$" denotes a maximum transmission power permitted by the network. "f" is a function that outputs an appropriate value to the input such as resource amount for uplink transmission, MCS level, and transmission power adjustment variable. The output value is in proportion of the input value in general. The transmission power adjustment variable can be managed per uplink carrier, and the variable is obtained by accumulating the TPCs received until a current time.

The operations of the UE in FIG. 7 are illustrated under the assumption of the downlink carriers explicitly belonging to a PC DL CG and the uplink carriers belonging to a PC UL CG; and the explicit signaling of the control message informing the correlation between the PC DL CG and the PC UL CG. The relationship between the downlink and uplink carriers can be determined according to a predetermined rule.

Figure 8:
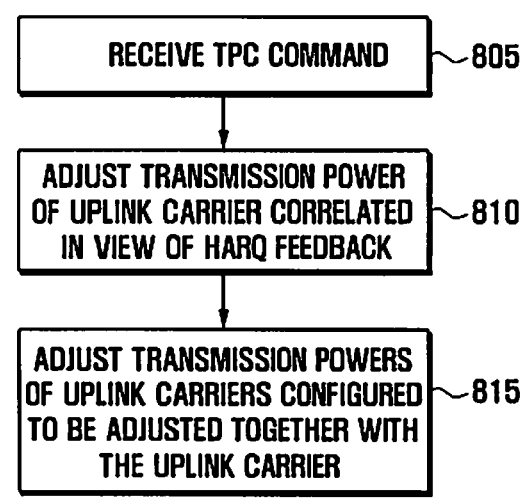
FIG. 8 is a flowchart illustrating a transmission power adjustment methodology of another UE, according to the first embodiment of the present invention.

Referring to FIG. 8, a flowchart illustrates exemplary operations of another UE, according to the first exemplary embodiment of the present invention. FIG. 8 shows the operations of the UE when downlink carriers are correlated with uplink carriers according to HARQ feedback. If a TPC command is received through a downlink carrier at step 805, the UE identifies an uplink carrier correlated with the downlink carrier according to HARQ feedback and adjusts the transmission power of the identified uplink carrier by an amount indicated by the transmission power control command at step 810. The UE identifies other uplink carriers that are aggregated with the uplink carrier correlated with the downlink carrier and adjusts the other aggregated uplink carriers by the amount indicated by the transmission power control command at step 815. The other uplink carriers have an identical reference downlink carrier or belong to the same PC UL CG.

In the first exemplary embodiment of the present invention, multiple TPC commands can be received for a single uplink carrier (or for a PC UL CG). The UE updates the transmission power adjustment variable of the uplink carrier (or the entire PC UL CG to which the uplink carrier belongs) with the summing result of the multiple transmission power control commands.

As shown in Equation 1, the path loss of the downlink carrier is considered in order to obtain the uplink power. When the carriers are aggregated, may be unclear which downlink carrier is to be considered for the path loss determination in order to calculate the uplink transmission power of an uplink carrier. One method is to use the path loss of the downlink carrier correlated with the uplink carrier according to HARQ feedback. However, when the uplink carrier is correlated with multiple downlink carriers according to HARQ feedback, it becomes difficult to determine the downlink carrier for the path loss with only the HARQ feedback.

Accordingly, a second exemplary embodiment of the present invention, the relationship between the uplink carrier and the downlink carrier in which path loss is used for calculating the transmission power of the uplink carrier is indicated explicitly through the control message. For instance, when the multiple uplink carriers are positioned in adjacent frequency bands, or in close proximity thereto, the pass loss of a single downlink carrier may be used for calculating the transmission power of the uplink carriers.

Figure 9:
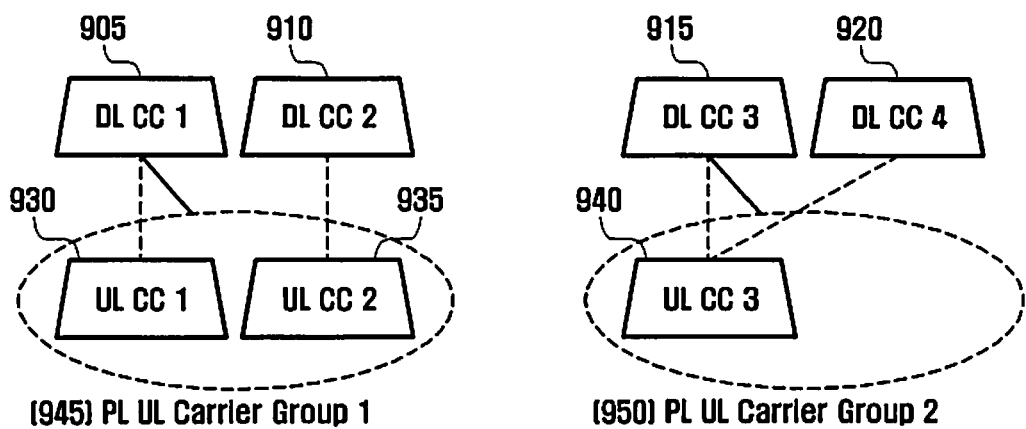
FIG. 9 is a diagram illustrating a configuration of a Path Loss Uplink Carrier Group (PL UL CG), according to a second embodiment of the present invention.

Referring to FIG. 9, a diagram illustrates an exemplary configuration of a Path Loss Uplink Carrier Group (PL UL CG), according to the second exemplary embodiment of the present invention. In this example, UE uses four aggregated downlink carriers, DL CC 1 (905), DL CC 2 (910), DL CC 3 (915), DL CC 4 (920), and three aggregated uplink carriers, UL CC 1 (930), UL CC 2 (935), UL CC 3 (940). The downlink and uplink carriers are correlated according to HARQ feedback as expressed with dotted lines as shown in FIG. 9. A group of uplink carriers of which transmission powers are calculated using the path loss of a specific downlink carrier is defined as a PL UL CG as expressed with a solid line. In FIG. 9, the UL CC 1 (930) and the UL CC 2 (935) belong to PL UL CG 1 (945), and the UL CC 3 (940) belongs to PL UL CG 2 (950). The transmission power of the uplink carriers belonging to the PL UL CG 1 (945) are calculated using the path loss of the DL CC 1 (905). The transmission power of the uplink carriers belonging to the PL UL CG 2 (950) are calculated using the path loss of the DL CC 3 (915).

Figure 10:
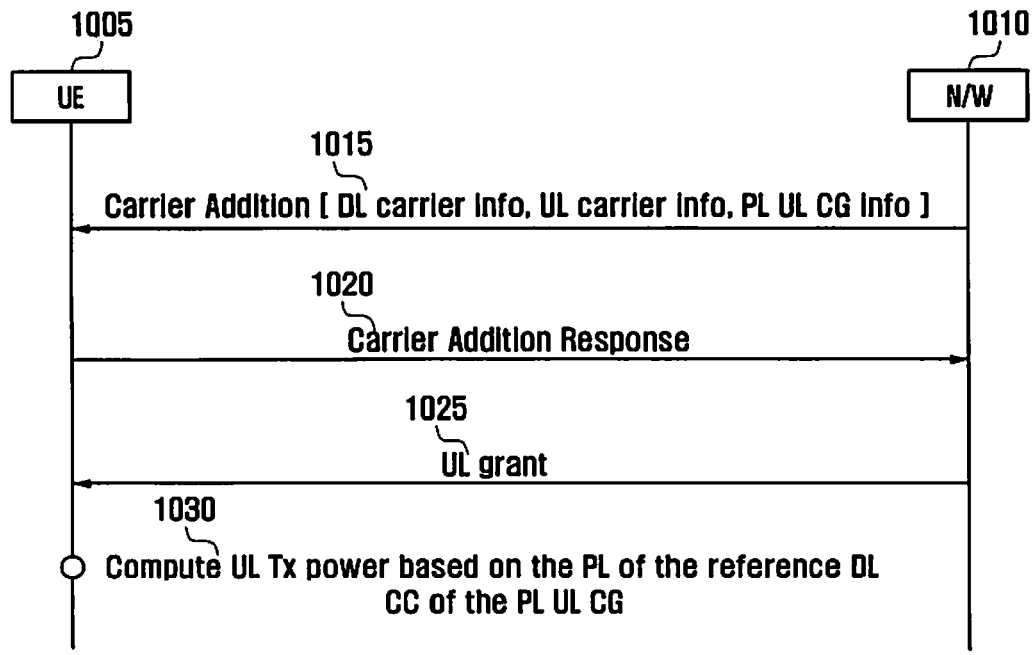
FIG. 10 is a message flow diagram illustrating message flows between a network and a UE, according to the second embodiment of the present invention.

Referring to FIG. 10, a message flow diagram illustrates exemplary message flows between a network and a UE, according to the second exemplary embodiment of the present invention. Specifically, FIG. 10 shows message flows between a UE 1005 and a network 1010 for carrier aggregation. The network 1010 can be an ENB. The network 1010 sends messages to the UE 1005 in a manner similar to that described above with reference to FIG. 6. The control message includes information on the carriers to be aggregated. The control message also may include information on the PL UL CG. The PL UL CG information includes information about the uplink carriers aggregated into the PL UL CG and the reference downlink carrier of the PL UL CG.

The information contained in the carrier aggregation message is described as shown in Table 5. Lower level information of the carrier aggregation information is identical with those described with reference to Tables 1 and 3.

TABLE 5

| Name | Description |
|---|---|
| > Carrier aggregation information | Information on the aggregated carriers. Multiple carrier aggregation information entities can be included in a control message. |
| > PL UL CG information | Information on PL UL CG. Multiple PL UL CG entities can be included in a control message. |
| >> UL CC id | Identifier assigned to uplink carriers belonging to a corresponding PL UL CG. Multiple UL CC ids can be included. |
| >> Reference downlink carrier | Identifier of a reference downlink carrier of which path loss is measured. |

Table 6 shows the information carried by an exemplary carrier aggregation message in aggregations of four downlink carriers and three uplink carriers as shown in FIG. 9.

TABLE 6

| > Carrier aggregation information | See table 2 or table 4. |
|---|---|
| > PL UL CG information | |
| >> UL CC id | UL CC 1, UL CC 2 |
| >> Reference downlink carrier | DL CC 1 |
| > PL UL CG information | |
| >> UL CC id | UL CC 3 |
| >> Reference downlink carrier | DL CC 3 |

When the PL UL CG is configured as shown in Table 6, the uplink transmission powers of the UL CC 1 (930) and the UL CC 2 (935) are calculated using the path loss of the DL CC 1 (905), and the uplink transmission power of the UL CC 3 (940) is calculated using the path loss of the DL CC 3 (915).

If the UE determines the reference downlink carrier according to a predetermined rule, the PL UL CG information can be included in the carrier aggregation information as shown in Table 7.

TABLE 7

| Name | Description |
|---|---|
| > Carrier aggregation information | |
| >> Downlink carrier information | |
| >>> DL CC id | Downlink carrier identifier |
| >>> Carrier Frequency | Center frequency of downlink carrier |
| >>> Bandwidth | Bandwidth of downlink carrier |
| >> Uplink carrier information | |
| >>> UL CC id | Uplink carrier identifier |
| >>> Carrier Frequency | Center frequency of uplink carrier |
| >>> Bandwidth | Bandwidth of uplink carrier |
| >>> PL UL CG information | Identifier of PL UL CG including uplink Carrier |

If the carrier aggregation information is received, the UE can identify the uplink carriers aggregated in a PL UL CG and select a downlink carrier having the lowest center frequency among the downlink carriers correlated with the uplink carriers according to HARQ feedback as a reference carrier. The UE also can randomly select one of the downlink carriers correlated with the uplink carriers according to HARQ feedback. This is possible because there is no need to select a specific downlink carrier as the reference downlink carrier from the viewpoint of path loss since the path loss differences among the downlink carriers positioned adjacent to or in close proximity with each other are likely to be small. Table 8 shows the information carried by a exemplary carrier aggregation message in aggregations of four downlink carriers and three uplink carriers as shown in FIG. 9.

TABLE 8

| > Carrier aggregation information | | > Carrier aggregation information | |
|---|---|---|---|
| >>Downlink carrier information | | >>Downlink carrier information | |
| >>> DL CC id | 1 | >>> DL CC id | 2 |
| >>> Carrier Frequency | f1 | >>> Carrier Frequency | f3 |
| >>> Bandwidth | 5 MHz | >>> Bandwidth | 5 MHz |
| >> Uplink carrier information | | >> Uplink carrier information | |
| >>> UL CC id | 1 | >>> UL CC id | 2 |
| >>> Carrier Frequency | f2 | >>> Carrier Frequency | f4 |
| >>> Bandwidth | 5 MHz | >>> Bandwidth | 5 MHz |
| >>> PL UL CG information | 1 | >>> PL UL CG information | 1 |
| > Carrier aggregation information | | > Carrier aggregation information | |
| >>Downlink carrier information | | >>Downlink carrier information | |
| >>> DL CC id | 3 | >>> DL CC id | 4 |
| >>> Carrier Frequency | f5 | >>> Carrier Frequency | f5 |
| >>> Bandwidth | 5 MHz | >>> Bandwidth | 5 MHz |
| >> Uplink carrier information | | >> Uplink carrier information | |
| >>> UL CC id | 3 | >>> UL CC id | 3 |
| >>> Carrier Frequency | f6 | >>> Carrier Frequency | f6 |
| >>> Bandwidth | 5 MHz | >>> Bandwidth | 5 MHz |
| >>> PL UL CG information | 2 | >>> PL UL CG information | 2 |

As shown in Table 8, the UE calculates the transmission powers of UL CC 1 (930) and UL CC 2 (935) using the path loss of a downlink carrier selected in accordance with a predetermined rule among the downlink carriers correlated with the uplink carriers. For example, the UE can use the path loss of the downlink carrier having the highest center frequency or the lowest center frequency or having a path loss measurement value at the time of determining the transmission power. In this example, it is noted that the downlink carrier must be correlated with one of the uplink carriers belonged to the corresponding PL UL CG according to HARQ feedback.

Alternatively, the downlink carrier of which path loss is used for determining the uplink transmission power can be explicitly indicated in the uplink carrier information as shown in Table 9.

TABLE 9

| Name | Description |
|---|---|
| > Carrier aggregation information | |
| >> Downlink carrier information | |
| >>> DL CC id | Downlink carrier identifier |
| >>> Carrier Frequency | Center frequency of downlink carrier |
| >>> Bandwidth | Bandwidth of downlink carrier |
| >> Uplink carrier information | |
| >>> UL CC id | Uplink carrier identifier |
| >>> Carrier Frequency | Center frequency of uplink carrier |
| >>> Bandwidth | Bandwidth of uplink carrier |
| >>> Reference downlink carrier information | Identifier of a downlink carrier of which path loss is measured for determining transmission power of uplink carrier. |

Table 10 shows the information carried by an exemplary carrier aggregation message in aggregations of four downlink carriers and three uplink carriers as shown in FIG. 9.

TABLE 10

| > Carrier aggregation information | | > Carrier aggregation information | |
|---|---|---|---|
| >>Downlink carrier information | | >>Downlink carrier information | |
| >>> DL CC id | 1 | >>> DL CC id | 2 |
| >>> Carrier Frequency | f1 | >>> Carrier Frequency | f3 |
| >>> Bandwidth | 5 MHz | >>> Bandwidth | 5 MHz |
| >> Uplink carrier information | | >> Uplink carrier information | |
| >>> UL CC id | 1 | >>> UL CC id | 2 |
| >>> Carrier Frequency | f2 | >>> Carrier Frequency | f4 |
| >>> Bandwidth | 5 MHz | >>> Bandwidth | 5 MHz |
| >>> Reference downlink carrier information | 1 | >>> PL UL CG information | 1 |
| > Carrier aggregation information | | > Carrier aggregation information | |
| >>Downlink carrier information | | >>Downlink carrier information | |
| >>> DL CC id | 3 | >>> DL CC id | 4 |
| >>> Carrier Frequency | f5 | >>> Carrier Frequency | f5 |
| >>> Bandwidth | 5 MHz | >>> Bandwidth | 5 MHz |
| >> Uplink carrier information | | >> Uplink carrier information | |
| >>> UL CC id | 3 | >>> UL CC id | 3 |
| >>> Carrier Frequency | f6 | >>> Carrier Frequency | f6 |
| >>> Bandwidth | 5 MHz | >>> Bandwidth | 5 MHz |
| >>> Reference downlink carrier information | 3 | >>> Reference downlink carrier information | 3 |

As shown in Table 10, the reference downlink carriers of both UL CC 1 (930) and UL CC 2 (935) are set to DL CC 1 (905) such that the UE determines the transmission powers of UL CC 1 (930) and UL CC 2 (935) using the path loss of DL CC 1 (905).

Referring again to FIG. 10, when the carrier aggregation information is received, the UE 1005 functions in a manner similar to that described above in FIG. 6.

The UE 1005 receives an uplink transmission resource allocation signal at step 1025, after sending the response message at step 1020. The uplink transmission resource allocation signal includes information related to a transmission resource and an MCS level for the uplink transmission. Upon receipt of the uplink transmission resource allocation signal, the UE 1005 identifies the PL UL CG to which the uplink carriers for the uplink transmission belongs and determines the uplink transmission power using the path loss of the reference downlink carrier of the identified PL UL CG at step 1030.

Figure 11:
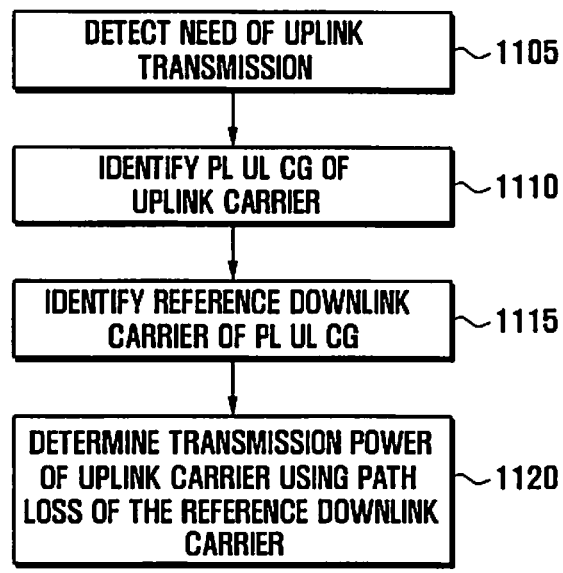
FIG. 11 is a diagram illustrating a transmission power determination methodology of a UE, according to the second embodiment of the present invention.

Referring to FIG. 11, a diagram illustrates an exemplary transmission power determination methodology of a UE, according to the second exemplary embodiment of the present invention.

When an uplink transmission allocation signal for the uplink carrier is received, the UE detects a need for performing uplink transmission through one of the aggregated uplink carriers at step 1105. The UE identifies the PL UL CG to which the uplink carrier belongs at step 1110. The relationship between the uplink carrier and the PL UL CG is configured in a call establishment process or a carrier aggregation process. The UE identifies the reference downlink carrier of the PL UL CG at step 1115. The mapping relationship between the PL UL CG and the reference downlink carrier can be configured by the network in the call establishment process or carrier aggregation process, or determined by the UE according to a predetermined rule. The UE determines the transmission power of the uplink carrier using the path loss of the identified reference downlink carrier at step 1120.

Figure 12:
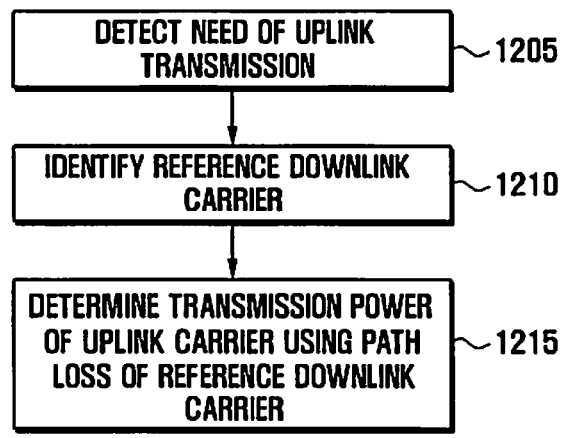
FIG. 12 is a diagram illustrating a transmission power determination methodology of another UE, according to the second embodiment of the present invention.

Referring to FIG. 12, a diagram illustrates another exemplary transmission power determination methodology of a UE, according to the second exemplary embodiment of the present invention. Specifically, FIG. 12 shows the operations of the mobile terminal in case that the reference carrier information is included in the uplink carrier information as shown in Table 9. When an uplink grant for the uplink carrier is received, the UE detects a need for performing uplink transmission through one of the aggregated uplink carriers at step 1205. The UE identifies the reference downlink carrier of the uplink carrier at step 1210. The relationship between the uplink carrier and the reference downlink carrier may be configured in a call establishment process or a carrier aggregation process. The UE determines the transmission power of the uplink carrier using the path loss of the reference downlink carrier in step 1215.

Figure 13:
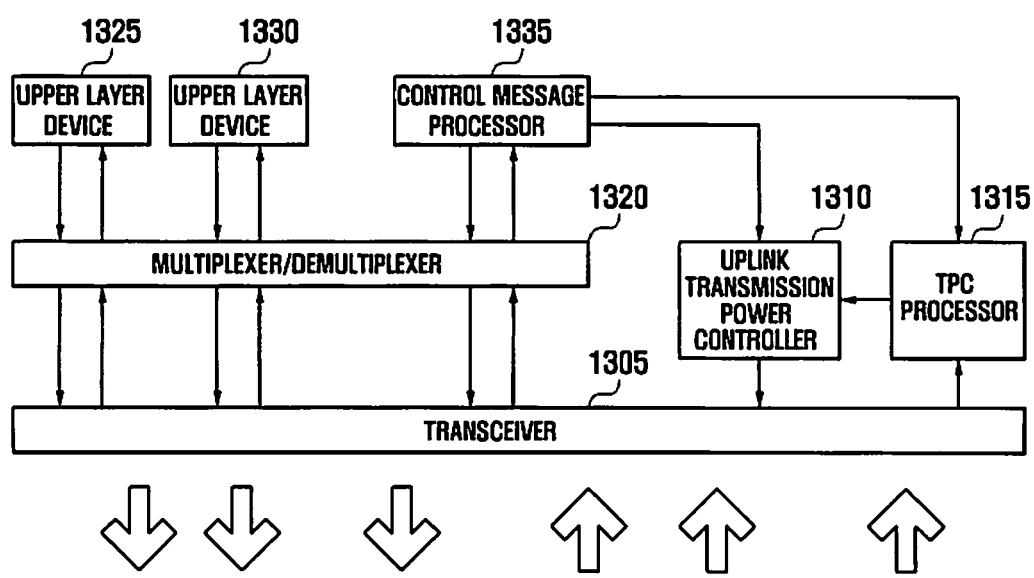
FIG. 13 is a diagram illustrating a configuration of a receiving device of a UE, according to an embodiment of the present invention.

Referring to FIG. 13, a diagram illustrates an exemplary configuration of a receiving device of a UE, according to an exemplary embodiment of the present invention. The device includes a transceiver 1305, a TPC processor 1315, an uplink transmission power controller 1310, a multiplexer/demultiplexer 1320, a control message processor 1335, and other upper layer devices 1325 and 1330.

The transceiver 1305 receives data and predetermined control signals via downlink carriers and transmits data and predetermined control signals via uplink carriers. The TPC processor 1315 analyzes a TPC command received through the downlink carrier and outputs an uplink transmission power adjustment value to the uplink transmission power controller 1310.

The uplink transmission power controller 1310 updates the uplink transmission power adjustment variables for an uplink carrier with the uplink transmission power adjustment value provided by the TPC processor 1315. The uplink transmission power controller 1310 also calculates an uplink transmission power of an uplink carrier using the value stored in an uplink transmission power adjustment variable corresponding to the uplink carrier. The uplink transmission power controller 1310 also controls the transceiver 1305 to perform uplink transmission with the transmission power determined by the transmission power controller 1310.

The multiplexer/demultiplexer 1320 performs multiplexing on the data output from the upper layer devices 1325 and 1330 and the control message processor 1335, performs demultiplexing on the data output by the transceiver 1305, and delivers the demultiplexed data to the upper layer devices 1325 and 1330 and/or the control message processor 1335.

The control message processor 1335 processes the control message transmitted by the network and performs appropriate operations as described above. For example, the control message processor 1335 extracts the PC DL CG information, PC UL CG information, and/or PL UL CG information from the carrier aggregation message and sends the extracted information to the TPC processor 1315.

The upper layer devices 1325 and 1330 can be configured for processing the data generated with the user services, such as File Transfer Protocol (FTP) or Voice over IP (VoIP), and transfers the processed user service data to the multiplexer or transfers the data demultiplexed by the demultiplexer to the upper layer service applications.

While the invention has been shown and described with reference to certain exemplary embodiments thereof, it will be understood by those skilled in the art that various changes in form and detail may be made therein without departing from the spirit and scope of the invention as defined by the appended claims and their equivalents.

What is claimed is:

1. A method for controlling uplink transmission power in a wireless communication system comprising the steps of:
    aggregating at least one of a plurality of downlink carriers and a plurality of uplink carriers and mapping the plurality of downlink carriers and the plurality of uplink carriers between a User Equipment (UE) and a network in the wireless communication system;
    receiving a message relating to uplink carrier transmission power at the UE from the network via a downlink carrier;
    detecting a need to perform an uplink transmission through at least one uplink carrier;
    identifying a reference downlink carrier of the at least one uplink carrier from uplink carrier information in the message;
    determining a value of a variable of the at least one uplink carrier using a path loss of the identified reference downlink carrier; and
    determining uplink transmission power of the at least one uplink carrier in accordance with the value of the variable.

2. The method of claim 1, wherein the aggregating and mapping steps are determined in accordance with at least one of loads of the plurality of downlink carriers and the plurality of uplink carriers and a traffic requirement status of the UE, and the aggregating and mapping steps result in at least one of one or more Power Control Downlink Carrier Groups (PC DL CGs), one or more Power Control Uplink Carrier Groups (PC DL CGs), and one or more Path Loss Uplink Carrier Groups (PL UL CGs).

3. The method of claim 1, wherein the aggregating and mapping steps comprise:
    receiving a control message from the network at the UE comprising information regarding aggregation and mapping of the plurality of downlink carriers and the plurality of uplink carriers; and
    sending a response message from the UE to the network.

4. The method of claim 3, wherein the control message comprises at least one of an identifier, a center frequency, a bandwidth, and a carrier group identifier, for each carrier in the control message.

5. The method of claim 1, wherein the plurality of downlink carriers and the plurality of uplink carriers are mapped and aggregated in accordance with at least one of carrier frequency and Hybrid Automatic Repeat reQuest (HARQ) feedback information.

6. The method of claim 1, wherein the message comprises an uplink transmission resource allocation signal.

7. The method of claim 6, wherein the reference downlink carrier comprises at least one of a downlink carrier having a lowest center frequency of downlink carriers mapped to the PL UL CG, a downlink carrier having a lowest center frequency of the downlink carriers mapped to the PL UL CG, a downlink carrier having a path loss measurement of the downlink carriers mapped to the PL UL CG, and a random downlink carrier of the downlink carriers mapped to the PL UL CG.

8. A User Equipment (UE) of a wireless communication system for controlling uplink transmission power comprising:
    a transceiver for transmitting and receiving messages relating to aggregation of at least one of a plurality of downlink carriers and a plurality of uplink carriers and to mapping of the plurality of downlink carriers and the plurality of uplink carriers between the UE and a network of the wireless communication system, and for receiving a message relating to uplink carrier transmission power from the network via a downlink carrier; and
    an uplink transmission power controller for detecting a need to perform an uplink transmission through at least one uplink carrier, identifying a reference downlink carrier of the at least one uplink carrier from uplink carrier information in the message, determining a value of a variable of the at least one uplink carrier using a path loss of the identified reference downlink carrier, and determining uplink transmission power of the at least one uplink carrier in accordance with the value of the variable.

9. The UE of claim 8, further comprising a control message processor that processes a control message received by the transceiver from the network comprising information regarding aggregation and mapping of the plurality of downlink carriers and the plurality of uplink carriers, and transmits a response message from the UE to the network.

10. The UE of claim 8, further comprising a multiplexer/demultiplexer and upper layer devices.

11. A network of a wireless communication system for controlling uplink transmission power that aggregates at least one of a plurality of downlink carriers and a plurality of uplink carriers, maps the plurality of downlink carriers and the plurality of uplink carriers between a User Equipment (UE) and the network in the wireless communication system, and transmits a message relating to uplink carrier transmission power to the UE via a downlink carrier, wherein uplink transmission power of the at least one uplink carrier is determined in accordance with a value of a variable,
    wherein a value of the variable is determined, by the UE, by detecting a need to perform an uplink transmission through at least one uplink carrier, identifying a reference downlink carrier of the at least one uplink carrier from uplink carrier information in the message, and determining a value of a variable of the at least one uplink carrier using a path loss of the identified reference downlink carrier.

12. The network of claim 11, wherein the network further transmits a control message to the UE comprising information regarding aggregation and mapping of the plurality of downlink carriers and the plurality of uplink carriers, and receives a response message from the UE.

* * * * *